(12) United States Patent
Aggarwal et al.

(10) Patent No.: US 11,321,207 B2
(45) Date of Patent: May 3, 2022

(54) SEAMLESS MULTI-CLOUD SDWAN DISTASTER RECOVERY USING ORCHESTRATION PLANE

(71) Applicant: Cisco Technology, Inc., San Jose, CA (US)

(72) Inventors: Mohit Aggarwal, San Jose, CA (US); Mohil Khare, San Jose, CA (US); Vinay Prabhu, Milpitas, CA (US); Kapil Dev, San Jose, CA (US); Gino John, Cupertino, CA (US); Pradeep Budanuru Kenche Gowda, Sunnyvale, CA (US); Farqad Moshili, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 33 days.

(21) Appl. No.: 16/806,750

(22) Filed: Mar. 2, 2020

(65) Prior Publication Data
US 2021/0011825 A1 Jan. 14, 2021

Related U.S. Application Data

(60) Provisional application No. 62/872,125, filed on Jul. 9, 2019.

(51) Int. Cl.
*G06F 11/00* (2006.01)
*G06F 11/30* (2006.01)
(Continued)

(52) U.S. Cl.
CPC ........ *G06F 11/3006* (2013.01); *G06F 9/4856* (2013.01); *G06F 9/5072* (2013.01);
(Continued)

(58) Field of Classification Search
CPC .. G06F 11/3006; G06F 9/5072; G06F 9/5088; G06F 9/4856; H04L 43/16;
(Continued)

(56) References Cited

U.S. PATENT DOCUMENTS

| 2016/0048408 A1* | 2/2016 | Madhu | G06F 11/2023 718/1 |
| 2016/0179618 A1* | 6/2016 | Resch | G06F 21/80 714/764 |

(Continued)

OTHER PUBLICATIONS

International Search Report and Written Opinion from the International Searching Authority, dated Sep. 25, 2020, 14 pages, for corresponding International Patent Application No. PCT/US2020/040344.

*Primary Examiner* — Anh Nguyen
(74) *Attorney, Agent, or Firm* — Polsinelli PC

(57) ABSTRACT

The present disclosure is directed to management of migration of SD-WAN solutions in a multi-cloud structure upon detection of a failover event. In one aspect, a method includes monitoring, using virtual bonds of a network orchestration component, clusters of virtual management components of multiple cloud networks, corresponding virtual management components of one of the multiple cloud networks implementing one or more services of a Software-Defined Wide Access Network (SD-WAN) solution; detecting, using the virtual bonds, a failover event at the one of the multiple cloud networks; and identifying, by the virtual bonds, a new destination cloud network to migrate the one or more services of the SD-WAN solution to, from a source cloud network at which the failover event is detected.

11 Claims, 5 Drawing Sheets

(51) Int. Cl.
   *G06F 9/50*       (2006.01)
   *H04L 43/16*      (2022.01)
   *H04L 43/0817*    (2022.01)
   *H04L 41/0654*    (2022.01)
   *H04L 12/46*      (2006.01)
   *H04L 41/0668*    (2022.01)
   *G06F 9/48*       (2006.01)

(52) U.S. Cl.
   CPC ........ *G06F 9/5088* (2013.01); *H04L 12/4633* (2013.01); *H04L 41/0654* (2013.01); *H04L 41/0668* (2013.01); *H04L 43/0817* (2013.01); *H04L 43/16* (2013.01)

(58) Field of Classification Search
   CPC ............. H04L 43/0817; H04L 41/0654; H04L 12/4633; H04L 12/2854; H04L 41/5096; H04L 41/0681; H04L 41/5035; H04L 41/0668
   See application file for complete search history.

(56) References Cited

U.S. PATENT DOCUMENTS

| | | |
|---|---|---|
| 2016/0217050 A1 | 7/2016 | Grimm et al. |
| 2016/0323377 A1* | 11/2016 | Einkauf ............. H04L 29/0827 |
| 2018/0232249 A1 | 8/2018 | Keohane et al. |
| 2019/0132211 A1 | 5/2019 | Yeung et al. |
| 2020/0162344 A1* | 5/2020 | Zapponi ................ H04L 41/044 |

* cited by examiner

SEAMLESS MULTI-CLOUD SDWAN DISTASTER RECOVERY USING ORCHESTRATION PLANE

CROSS-REFERENCE TO RELATED APPLICATIONS

This application claims priority to U.S. Provisional Patent Application No. 62/872,125, filed on Jul. 9, 2019, the content of which is incorporated herein by reference in its entirety.

TECHNICAL FIELD

The subject matter of this disclosure relates in general to the field of computer networking, and more particularly, to systems and methods for management of migration of software defined network components in a multi-cloud setting from a source to a destination cloud.

BACKGROUND

A Software Defined Network (SD-WAN) provides connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, universities, factories, etc. Implementation of a SD-WAN may be over a multi-cloud structure.

When there is a failure the multi-cloud structure, a particular SD-WAN solution implemented using such structure may need to be moved around and migrated from one cloud structure to another. Current solutions for enabling such migration relies on a third party witness component, which, needs to be stitched to the SD-WAN fabric. Furthermore, managing lifecycle of the third party witness component places additional burden on the network, there is minimal to no visibility in the health of the third party witness component, and the third party witness component is a single point of failure that requires high availability and reliance.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
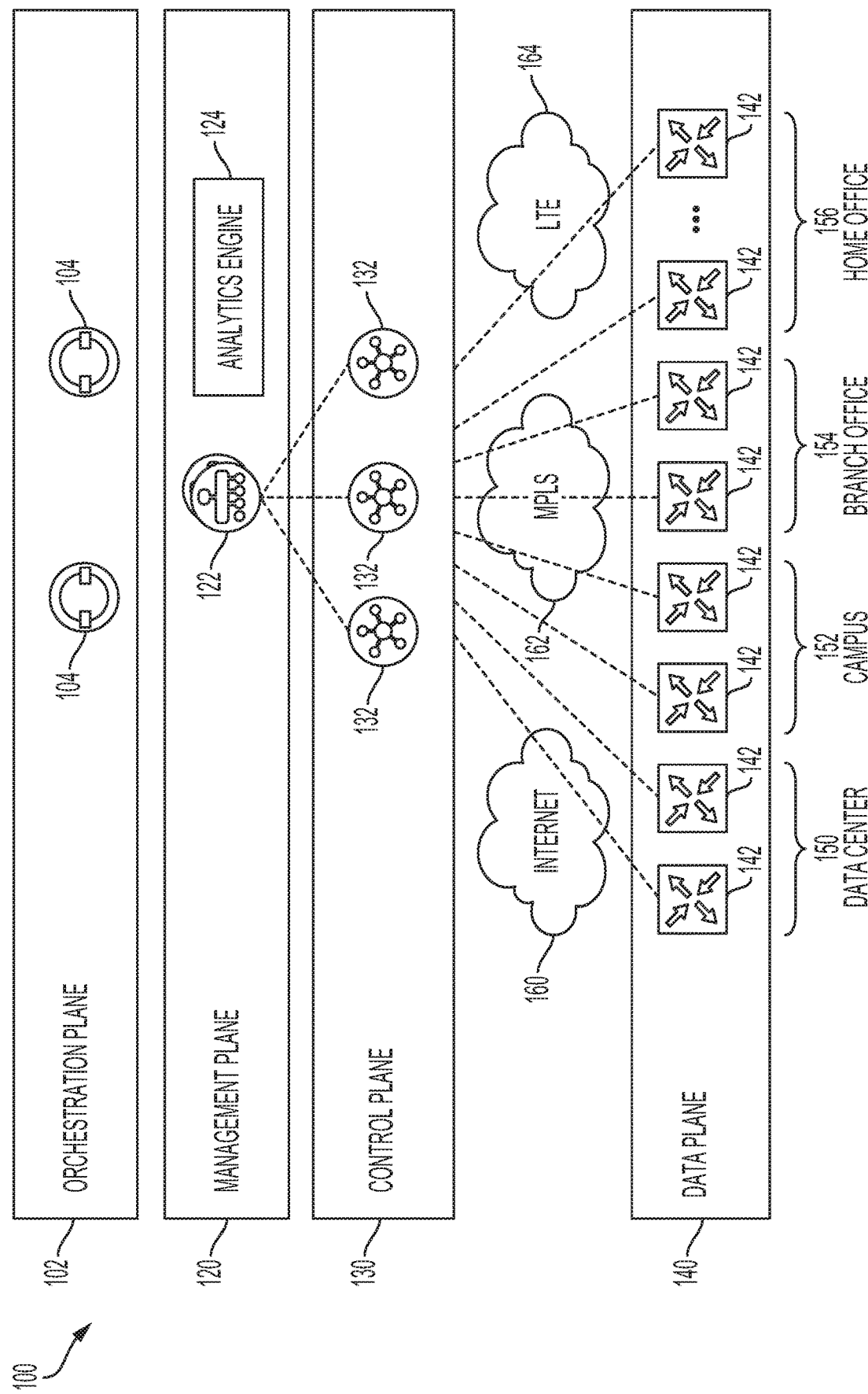
FIG. 1 illustrates a network architecture, according to an aspect of the present disclosure

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

As noted above, currently a Software Defined Network (SD-WAN) fabric owner has to create a third party witness component and stitch the same into the SD-WAN fabric in order to manage migration of SD-WAN from a source to a destination cloud, in a multi-cloud structure. The present disclosure presents solutions and mechanisms to effect migration of SD-WAN components from a source to a destination cloud in the multi-cloud structure without using a third party witness component and thus eliminating the drawbacks of reliance on a third party witness component.

In one aspect, a method includes monitoring, using virtual bonds of a network orchestration component, clusters of virtual management components of multiple cloud networks, corresponding virtual management components of one of the multiple cloud networks implementing one or more services of a Software-Defined Wide Access Network (SD-WAN) solution; detecting, using the virtual bonds, a failover event at the one of the multiple cloud networks; and identifying, by the virtual bonds, a new destination cloud network to migrate the one or more services of the SD-WAN solution to, from a source cloud network at which the failover event is detected.

In another aspect, each of the virtual bonds has an established secure channel to each virtual management component in each of the clusters.

In another aspect, monitoring the clusters includes determining a number of inactive virtual management components of each of the multiple cloud networks.

In another aspect, detecting the failover event includes determining, by each of the virtual bonds and based on the number of inactive virtual management components in the one of the multiple cloud networks, an active status or an inactive status for a corresponding cluster; and determining the failover event for the one of the multiple cloud networks, when a first threshold number of the virtual bonds determine that the number of inactive virtual management components in the corresponding cluster is equal to a second threshold.

In another aspect, identifying the new destination cloud network includes determining a combined weight of virtual management components in a target destination cloud; and identifying the target destination cloud as the new destination cloud if the combined weight of the virtual management components in the target destination cloud is equal to or greater than a third threshold.

In another aspect, determining the combined weight is based on a corresponding assigned weight, corresponding configuration parameters and a corresponding location of each of the virtual management components in the target destination cloud.

In another aspect, the method further includes communicating to virtual smart components in a network control and data plane, identification information of the new destination cloud, the virtual smart components triggering network edge devices to shift to a cluster of virtual network components of the new destination cloud.

In one aspect, a network controller includes memory having computer-readable instructions stored therein and one or more processors. The one or more processors are configured as virtual bonds of a Software Defined Wide Area Network (SD-WAN) solution to execute the computer-readable instructions to monitor clusters of virtual management components of multiple cloud networks, corresponding virtual management components of one of the multiple cloud networks implementing one or more services of a Software-Defined Wide Access Network (SD-WAN) solution; detect a failover event at the one of the multiple cloud networks; and identify a new destination cloud network to migrate the one or more services of the SD-WAN solution to, from a source cloud network at which the failover event is detected.

In one aspect, one or more non-transitory computer-readable media include computer-readable instructions, which when executed by one or more processors, cause the one or more processors to function as virtual bonds of a Software Defined Wide Area Network (SD-WAN) solution to monitor clusters of virtual management components of multiple cloud networks, corresponding virtual management components of one of the multiple cloud networks implementing one or more services of a Software-Defined Wide Access Network (SD-WAN) solution; detect a failover event at the one of the multiple cloud networks; and identify a new destination cloud network to migrate the one or more services of the SD-WAN solution to, from a source cloud network at which the failover event is detected.

DETAILED DESCRIPTION

Using such third party witness component has several drawbacks. First, the third party witness component needs to be stitched into the SD-WAN fabric. Second, it is not possible for the third party witness component to select a correct destination cloud for migration based on enforced policy on the edge of the network overlay. Third, the third party witness component needs to establish a secure communication with a vManage cluster of the multi-cloud architecture. Fourth, because the vBond is in the orchestration plane of the overlay, the third party witness component needs to have a permanent secure connection with vBond to configure the vManage cluster of the destination cloud as valid to ensure the migration of control and data plane to destination vManage cluster. Fifth, management of the lifecycle of the third party witness component lies with the fabric owner of the SD-WAN. Sixth, there is no visibility into the health of the third party witness component. Finally, a third party witness component is a single point of failure and thus needs to have high reliability and availability.

Solutions proposed by the present disclosure to manage migration of SD-WANs across a multi-cloud structure when there is a failure in the structure, eliminates the use of third party witness components and addresses the above drawbacks of using third party witness components. The proposed solutions will be fully described below.

The disclosure begins an overview of a SD-WAN and corresponding architecture.

FIG. 1 illustrates a network architecture, according to an aspect of the present disclosure. An example of an implementation of the network architecture 100 is the Cisco® Software Defined Wide Area Network (SD-WAN) architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other example embodiments may include different numbers and/or types of elements but one of ordinary skill the art will appreciate that such variations do not depart from the scope of the present disclosure.

In this example, network architecture 100 can comprise an orchestration plane 102, a management plane 120, a control plane 130, and a data plane 140. Orchestration plane 102 can assist in the automatic on-boarding of edge network devices 142 (e.g., switches, routers, etc.) in an overlay network. Orchestration plane 102 can include one or more physical or virtual network orchestrator appliances 104. Network orchestrator appliances 104 can perform the initial authentication of edge network devices 142 and orchestrate connectivity between devices of control plane 130 and data plane 140. In some example embodiments, network orchestrator appliances 104 can also enable communication of devices located behind Network Address Translation (NAT). In some example embodiments, physical or virtual Cisco® SD-WAN vBond appliances can operate as network orchestrator appliances 104.

Management plane 120 can be responsible for central configuration and monitoring of a network. Management plane 120 can include one or more physical or virtual network management appliances 122. Network management appliances 122 can provide centralized management of the network via a graphical user interface to enable a user to monitor, configure, and maintain edge network devices 142 and links (e.g., Internet transport network 160, Multi-Protocol Label Switching (MPLS) network 162, 4G/LTE network 164) in an underlay and overlay network. The network management appliances 122 can support multi-tenancy and enable centralized management of logically isolated networks associated with different entities (e.g., enterprises, divisions within enterprises, groups within divisions, etc.). Alternatively or in addition, network management appliances 122 can be a dedicated network management system for a single entity. In some example embodiments, physical or virtual Cisco® SD-WAN vManage appliances can operate as network management appliances 122.

Management plane 120 can also include an analytics engine 124 for providing visibility into the performance of applications and the network over time, such as the best and worst performing applications, the most bandwidth consuming applications, anomalous applications families (e.g., applications whose bandwidth consumption change over a period of time), network availability and circuit availability, carrier health, best and worst performing tunnels, and so forth. Analytics engine 124 may generate graphical representations of an overlay network and enable users to drill down to display the characteristics of a single carrier, tunnel, or application at a particular time and can present the same to a network administrator via a user interface of network management appliances 122 (e.g., vManage). The user interface can serve as an interactive overview of the network and an entrance point for more details. In some example embodiments, the user interface can display information for the last 24 hours and enable a user to drill down to select different time periods for different data sets to display. The user interface can also display data for network availability, WAN performance by carrier, and applications, among other network analytics.

In some example embodiments, analytics engine 124 can provide application performance with a Virtual Quality of Experience (vQoE) value, which can be customized for individual applications. This value can range from zero to ten, with zero being the worst performance and ten being the best. The analytics engine can calculate vQoE based on latency, loss, and jitter, and customize the calculation for each application.

Control plane 130 can build and maintain a network topology and make decisions on where traffic flows. Control plane 130 can include one or more physical or virtual network controller appliances 132. Network controller appliances 132 can establish secure connections to each edge network device 142 and distribute route and policy information via a control plane protocol (e.g., Overlay Management Protocol (OMP), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some example embodiments, network controller appliances 132 can operate as route reflectors. Network controller appliances 132 can also orchestrate secure connectivity in data plane 140 between and among edge network devices 142. For example, in some example embodiments, network controller appliances 132 can distribute crypto key information among edge network devices 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some example embodiments, physical or virtual Cisco® SD-WAN vSmart controllers can operate as the network controller appliances 132.

Data plane 140 can be responsible for forwarding packets based on decisions from control plane 130. Data plane 140 can include edge network devices 142, which can be physical or virtual network devices. Edge network devices 142 can operate at the edges of various network sites associated with an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). Edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as edge network devices 142.

Figure 2:
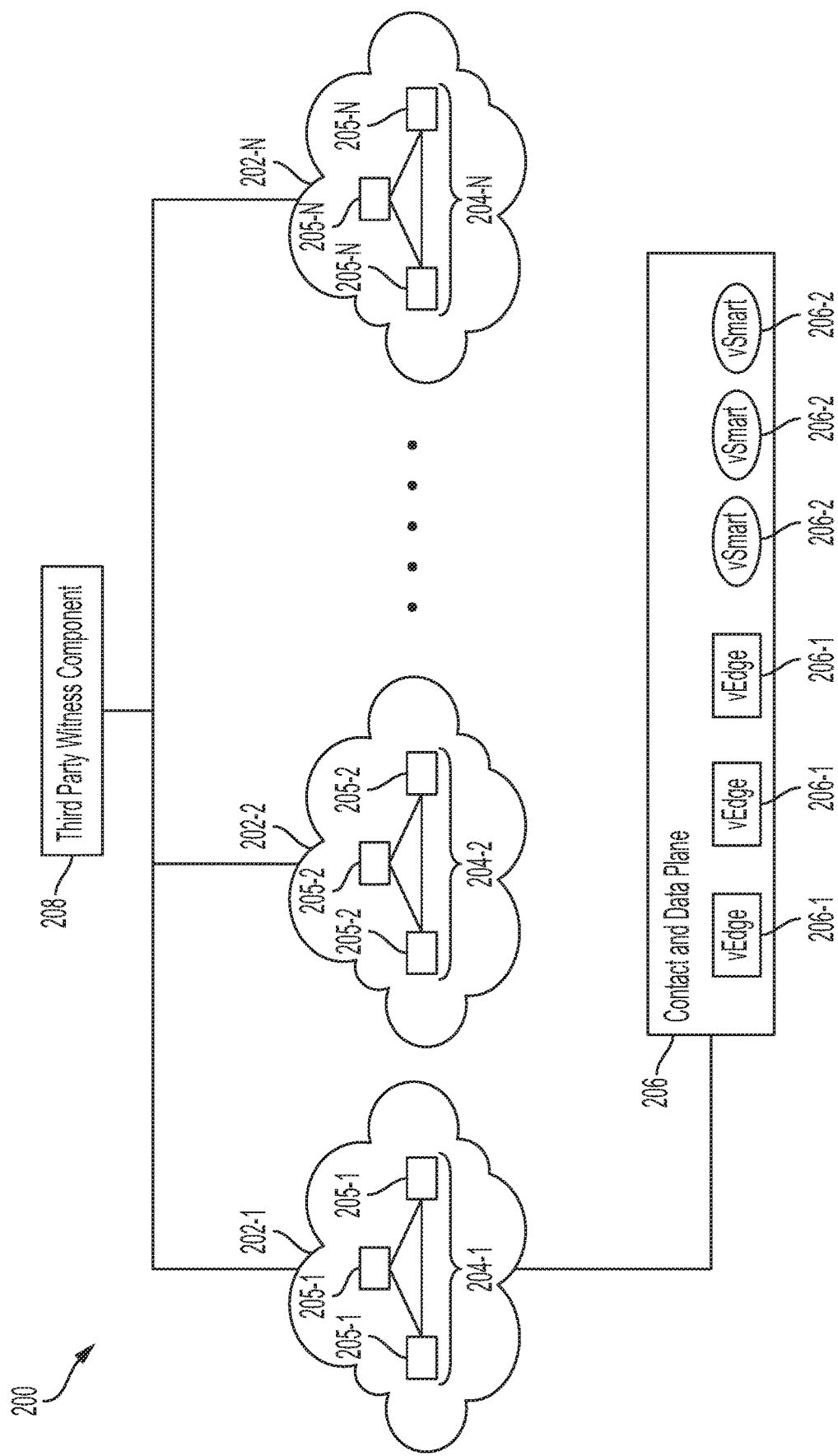
FIG. 2 illustrates an example of a multi-cloud architecture with a third party witness component for managing SD-WAN migration, according to an aspect of the present disclosure

FIG. 2 illustrates an example of a multi-cloud architecture with a third party witness component for managing SD-WAN migration, according to an aspect of the present disclosure.

Architecture 200 is a multi-cloud structure with multiple cloud structures. The number of multiple cloud structures can be two or more. In example of FIG. 2, multiple cloud structures 202-1, 202-2, . . . , 202-N are shown, where N is an integer equal to or greater than 3. Each of multiple cloud structures 202-1, 202-2, . . . , 202-N can have a cluster of vManages (e.g., within corresponding management plane 120 as described above with reference to FIG. 1). For example, cloud structure 202-1 have a cluster 204-1 of interconnected vManages 205-1 (which in this example include 3 vManages 205-1 but the number of vManages 205-1 can be different such as 1, 2, 3, etc.). Similarly, cloud structure 202-2 has cluster 204-2 of interconnected vManages 205-2, cloud structure 202-N has cluster 204-N of interconnected vManages 205-N, etc. In example of FIG. 2, a SD-WAN solution is assumed to be currently deployed and operational on cloud structure 202-1. Therefore, cloud structure 202-1 may be referred to as source cloud.

A vManage component such as vManage 205-1 is a graphical user interface based controller for provisioning and managing the SD-WAN infrastructure deployed in the corresponding cloud of the multi-cloud structure of FIG. 2. vManage provides the ability to manage all aspects of the WAN—from provisioning, monitoring, and upgrading routers to application visibility and troubleshooting the WAN.

Architecture 200 further includes control and data plane components 206 for SD-WAN solution currently operation on cloud structure 202-1. Among other components known to those skilled in the art, control and data plane components 202 include a number of vEdges 206-1 and vSmart 206-2 components. Number of vEdges 206-1 and vSmarts 206-2 is not limited to that shown in FIG. 2 but can be more or less. A vSmart is a centralized brain/controller of a SD-WAN solution that implements policies and connectivity between SD-WAN branches. The centralized policy engine in Cisco vSmart Controllers provides policy constructs to manipulate routing information, access control, segmentation, extranets, and service chaining. vEdges, as described above, are SD-WAN routers that can operate as edge network devices.

Network architecture 200 further includes a third party witness component 208 that is communicatively coupled to each cloud structure 202-1, 202-2, . . . , 202-N and is currently utilized for managing migration of SD-WAN solutions from a source cloud (e.g., cloud structure 202-1) to a destination cloud (e.g., one of cloud structures 202-2, . . . , 202-N) when a particular cloud structure and support cluster of vManages fails (this migration process may also be referred to as disaster recovery).

As noted above, using third party witness component for disaster recovery and SD_WAN solution migration has several drawbacks. First, third party witness component 208 needs to be stitched into the fabric as shown in FIG. 2. Second, it is impossible for the third party witness component 209 to select the correct destination cloud based on the policy enforced on the edge of the overlay. Third, third party witness component 208 needs to establish secure connection with vManage cluster of the source and destination cloud structures (e.g., clusters 204-1 and one of clusters 204-2, . . . , 204-N). Fourth, since %/Bonds are the orchestrator of the overlay, third party witness component 208 needs to have a permanent secure connection with vBond to configure the destination vManage cluster as valid (e.g., one of vManage clusters 204-2, . . . , 204-N). This will ensure the migration of control and data plane of the SD-WAN solution to destination vManage cluster. Fifth, onus of managing the lifecycle on the third party witness component 208 lies with the fabric owners. Sixth, third party witness component 208 relies on a polling model which only checks the reachability of a currently operational vManage cluster and thus there is no visibility into the service health of third party witness component. Seventh, since third party witness component 208 is a single point of failure therefore, high availability and reliability of third party witness component 208 should be ensured.

Figure 3:
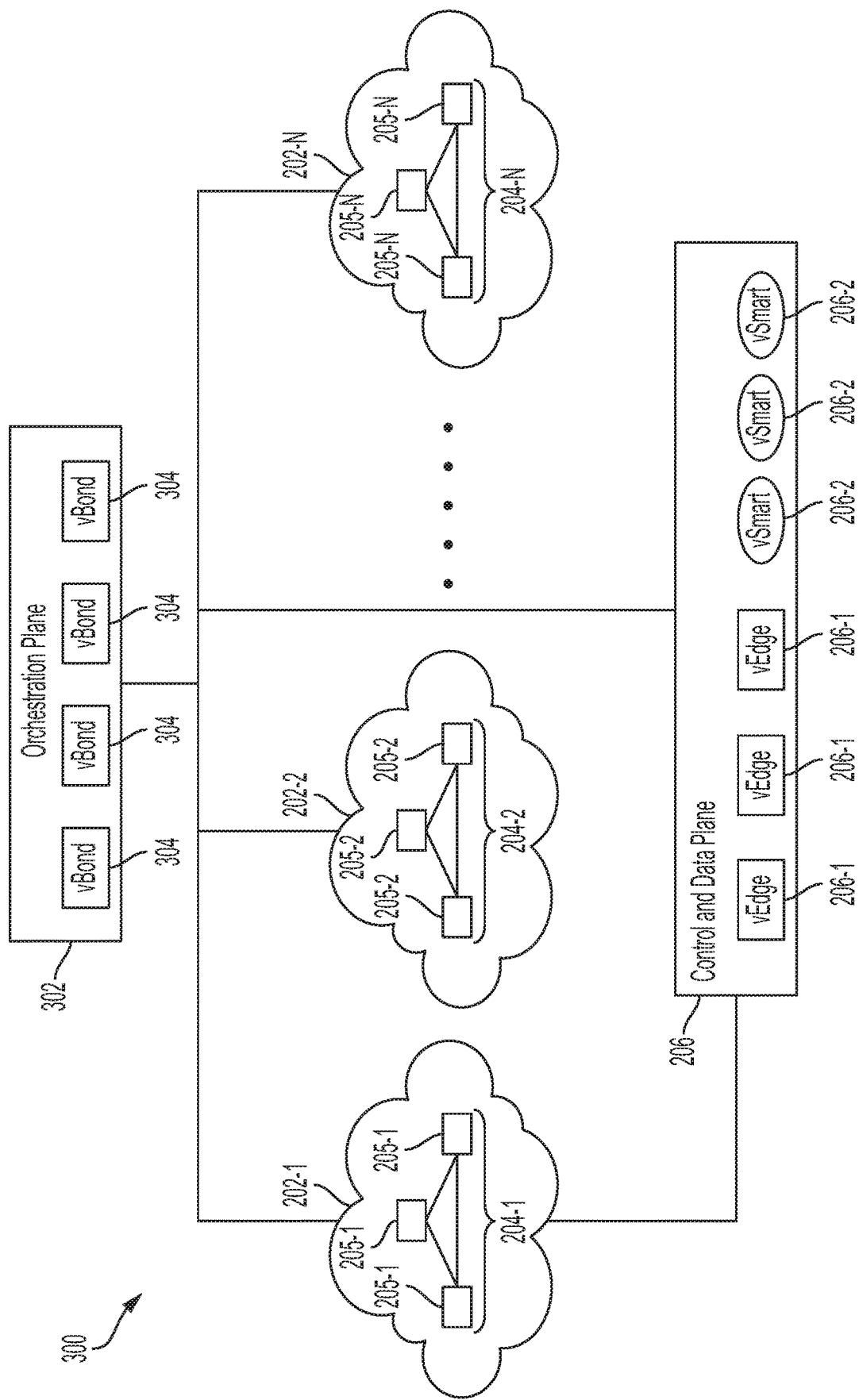
FIG. 3 illustrates an example of a multi-cloud architecture for managing SD-WAN migration without relying on a third party witness component, according to an aspect of the present disclosure.
Figure 4:
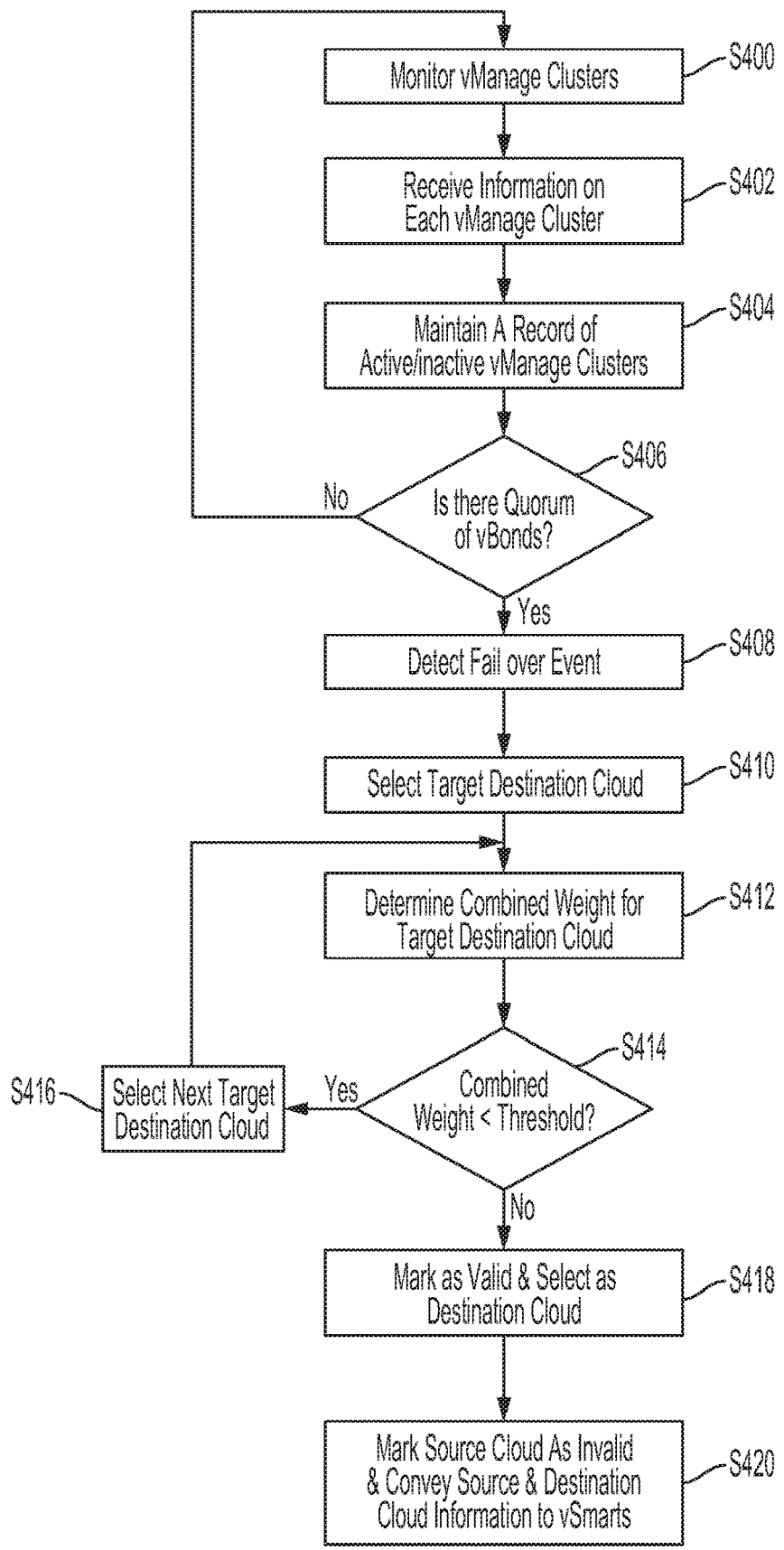
FIG. 4 describes an example method of managing SD-WAN migration in a multi-cloud structure, according to an aspect of the present disclosure.

In view of the above drawbacks of relying on third party witness component 208 for managing SD-WAN migration and disaster recovery, structure and process of FIGS. 3 and 4 are described below to address these drawbacks.

FIG. 3 illustrates an example of a multi-cloud architecture for managing SD-WAN migration without relying on a third party witness component, according to an aspect of the present disclosure. In describing architecture 300 of FIG. 3, components thereof that are the same as their corresponding counter parts of FIG. 2 are numbered the same and thus will not be further described for sake of brevity.

In contrast to architecture 200, architecture 300 has orchestration plane 302, which can be the same as orchestration plane 102 of FIG. 1. Orchestration plane 302 has one or more vBonds 304, which are orchestrators that can facilitate the initial bring-up of an SD-WAN solution by performing authentication and authorization of all elements into the SD-WAN. vBond orchestrators 304 also provide information on how each of the components of an SD-WAN solution connects to other components.

As can be seen from the structure of FIG. 3, orchestration plane 302 and hence vBonds 304 are connected to each of cloud structures 202-1, . . . , 202-N as well as control and data plane 206. Furthermore, each vManage of each of clusters 204-1, . . . , 204-N have a weight assigned thereto, which as will be described in more detail below, are used to manage migration of SD-WAN solutions across clouds.

Architecture 300 utilizes and leverages existing orchestration plane 302 to monitor vManages of clusters 204-1, . . . , 204-N and trigger migration of control and data plane of a SD-WAN solution from a source cloud to a destination cloud during disaster recovery. By relying on the existing orchestration plane 302, third party witness component 208 is no longer needed and shortcomings thereof, as described above, are addressed per process of FIG. 4 below.

FIG. 4 describes an example method of managing SD-WAN migration in a multi-cloud structure, according to an aspect of the present disclosure. FIG. 4 will be described from a perspective of orchestration plane 302 and more particularly vBonds 304. For purposes of describing FIG. 4, vBonds 304 may be referred to as a controller (network controller). It should be noted that such vBonds 304 may be implemented by one or more processors executing computer-readable instructions to implement steps of FIG. 4 described below.

At S400, vBonds 304 monitor clusters of virtual management components (e.g., vManage clusters 204-1, 204-2, . . . , 204-N). vBonds 304, by virtue of the design of SD-WANs, maintain a permanent secure connection to each vManage cluster of clusters 204-1, 204-2, . . . , 204-N. At S400, vBonds 304 not only monitor the reachability of clusters 204-1, 204-2, . . . , 204-N, but also health, including but not limited to availability of various services running in a given vManage cluster (databases, messaging bus, etc.). vBonds 304 not only connect each cluster 204-1, 204-2, . . . , 204-N but also to each vManage within each of these clusters.

At S402, vBonds 304 may receive information on preferences, weight and location of each vManage cluster. In one example, such preferences, weights and location information may be configured by a network administrator via vManage itself. A preference can be a numerical value based on a best effort to use a preferred circuit to connect to another component within the network. A weight can also be a numeric value used for load balancing among vManages of a given cluster. Location can represent the geographical location of each vManage of a given cluster that can be used to lower latency and redundancy within the network.

In one example, a similar process may be used in vSmarts 206-2 for load balancing, which is described in U.S. application Ser. No. 15/286,116 filed on Oct. 5, 2016, the entire content of which is incorporated herein by reference.

At S404, vBonds 304 maintain a record, based on received preferences, weights and locations, a record of active v. inactive vManage clusters. For example, a vManage cluster may be determined to be active if a number of vManages in the cluster that are operational is more than a configurable threshold (determined based on experiments and/or empirical studies).

At S406, it is determined whether a threshold number of vBonds 304 determine a number of active vManages in a given vManage cluster (e.g., a threshold number of vManages in cluster 204-1) are active (and/or alternatively inactive). This may be referred to as a quorum of vBonds 304. The threshold for quorum of vBonds 304 is a configurable parameter that may be determined based on experiments and/or empirical studies. For examples, assuming that a SD-WAN solution is currently being executed on cluster 202-1, at S406, it is determined whether a quorum of vBonds 304 is achieved that indicates a threshold number of vManages in vManage cluster 204-1 are active (and/or inactive).

If at S406, the quorum of vBonds 304 is not reached, the process reverts back to S400 and S400-S406 are repeated. However, if at S406, the quorum of vBonds 304 is reached, then at S408, a failover event is detected. The failover event triggers a migration of a SD-WAN solution from a current cloud structure (e.g., cloud 202-1) to a destination cloud (e.g., one of cloud structures 202-2, . . . , 202-N).

Upon detecting a failover event at S408, at S410, a target destination cloud (e.g., one of cloud structures 202-2, . . . , 202-N) is selected.

At S412, vBonds 304 determine a combined weight for the target destination cloud. In one example, the target destination cloud is allotted a configurable preference and location while each vManage in the corresponding cluster (e.g., one of vManage clusters 204-2, . . . , 204-N) has a configurable weight. Based on the configurable weight of each vManage and the configurable preference and location, a combined weight is determined for the target destination cloud.

For example, structure 300 may have three clouds 202-1, 202-2 and 202-3 (e.g., Amazon Web Services®, Google® and Microsoft®, respectively), with cloud structure 202-1 being the source (primary) cloud structure. Therefore, cloud structures 202-2 and 202-3 can each be a target destination cloud. Furthermore, assume that combined weight for vManages 205-2 of cloud structure 202-2 have a combined numerical value of 10 while vManages 205-3 of cloud structure 202-3 (not explicitly illustrated in FIG. 3) have a combined numerical value of 5. Moreover, assume that preference of cloud structure 202-2 has a numerical value of 2 while that of cloud structure 202-3 has a numerical value of 4. Lastly, assume that location of infrastructure providing cloud structure 202-2 is preferred (example numerical value of 1) for execution of SD-WAN solution relative to that of cloud structure 202-3 (example numerical value of 0). Therefore, combined weight of cloud structure 202-2 is 13 while that of cloud structure 202-3 is 9.

At S414, it is determined whether the combined weight of the target destination cloud is below a configurable threshold (target threshold, a non-limiting numerical example of which is 10). If it is determined that the combined weight is less than the target threshold (e.g., which is 9 for cloud structure 2020-3 in non-limiting example described above), at S416, a next target destination cloud is selected and S412 and S414 are repeated for the next target destination cloud.

Once at S414, it is determined that the combined weight of a target destination cloud is equal to or greater that the target threshold (or alternatively only greater than the target threshold, then at S418, the target destination cloud is marked as valid and selected as the destination cloud (e.g., cloud structure 202-2) to migrate SD-WAN solution to from the source cloud (e.g., from cloud structure 202-1). In the non-limiting example described above, combined weight of cloud structure 202-2 is 13, which is above the example threshold 10 and thus is selected as the destination cloud.

At S420, vBonds 304 mark the source cloud (e.g., cloud structure 202-1) as invalid and convey the invalid status of the source cloud and information about the selected destination cloud (e.g., cloud structure 202-2) to all vSmarts in the control and data plane component 206. In one example, vSmarts, on receiving new destination cloud information (e.g., of cloud structure 202-2), will do make before break operation to connect to the new destination cloud and will now inform ALL edge devices (vEdges) of control and data plane component 206 about the change in management plane, thereby triggering shift of all edge devices to the new vManage cluster (e.g., vManage cluster 204-2) in a destination cloud (e.g., in destination cloud structure 202-2).

With above examples of peer node discovery process described, the disclosure now turns to description of device components and architectures that can be implemented as any one of network management appliances 122, network controller appliances 132, edge network devices 142, etc.

With examples of migration management of SD-WAN instances in a multi-cloud structure, as described above, the disclosure now turns to description of example components that can be utilized as controllers and components of multi-cloud structure 200 to implement the migration management.

Figure 5A:
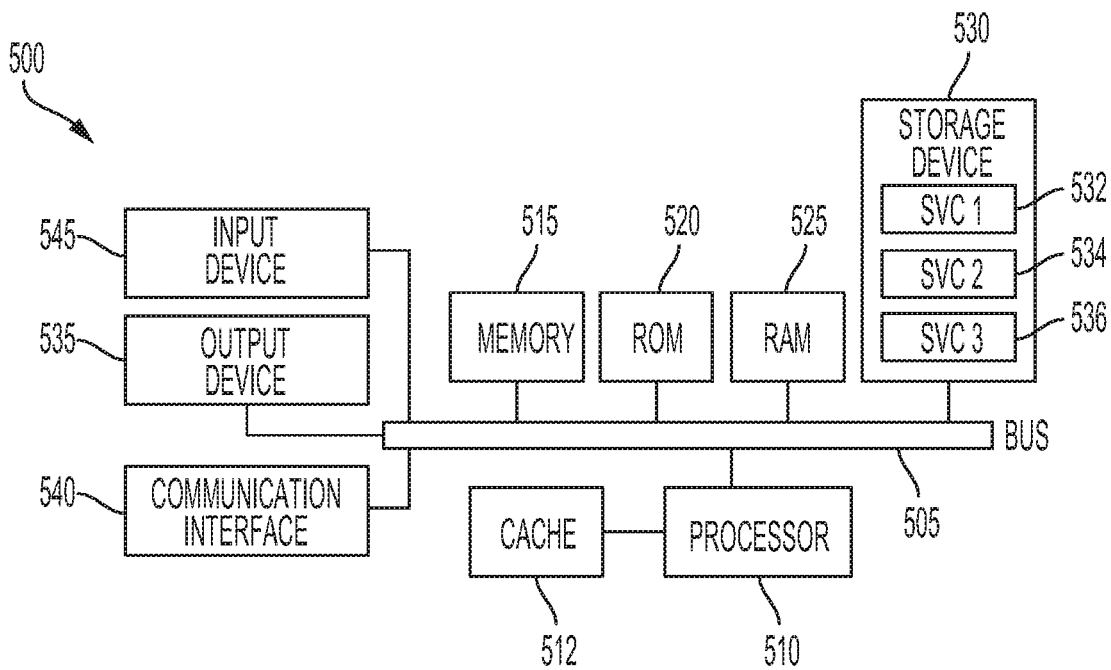
FIGS. 5A-B illustrate examples of systems, according to an aspect of the present disclosure.
Figure 5B:
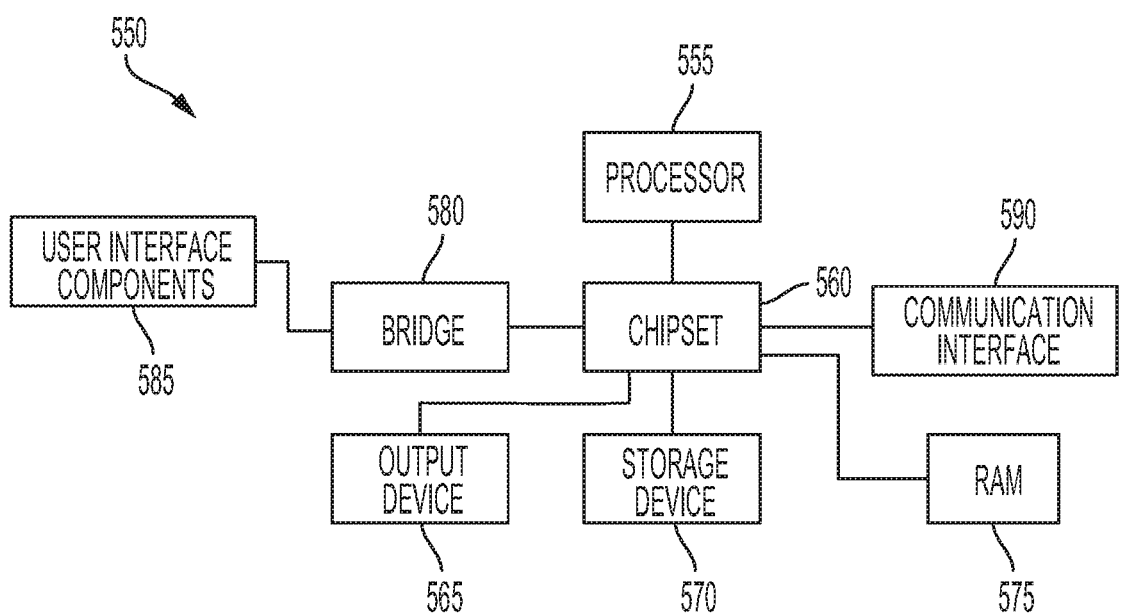

FIGS. 5A-B illustrate examples of systems, according to an aspect of the present disclosure.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module, such as SERVICE (SVC) 1 532, SERVICE (SVC) 2 534, and SERVICE (SVC) 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software services 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 560 that can control input to and output from the processor 555. In this example, the chipset 560 can output information to an output device 565, such as a display, and can read and write information to storage device 570, which can include magnetic media, solid state media, and other suitable storage media. The chipset 560 can also read data from and write data to RAM 575. A bridge 580 for interfacing with a variety of user interface components 585 can be provided for interfacing with the chipset 560. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 560 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    monitoring, using virtual bonds an orchestration plane of a Software-Defined Wide Access Network (SD-WAN) network, clusters of virtual management components of multiple cloud networks, corresponding virtual management components of one of the multiple cloud networks implementing one or more services of a SD-WAN solution;

detecting, using the virtual bonds, a failover event at the one of the multiple cloud networks; and identifying, by the virtual bonds, a new destination cloud network to migrate the one or more services of the SD-WAN solution to, from a source cloud network at which the failover event is detected;

wherein each of the virtual bonds has an established secure channel to each virtual management component in each of the clusters;

wherein monitoring the clusters comprises determining a number of inactive virtual management components of each of the multiple cloud networks;

wherein detecting the failover event comprises:
  determining, by each of the virtual bonds and based on the number of inactive virtual management components in the one of the multiple cloud networks, an active status or an inactive status for a corresponding cluster; and
  determining the failover event for the one of the multiple cloud networks, when a first threshold number of the virtual bonds determine that the number of inactive virtual management components in the corresponding cluster is equal to a second threshold.

2. The method of claim 1, wherein identifying the new destination cloud network comprises:
  determining a combined weight of virtual management components in a target destination cloud;
  identifying the target destination cloud as the new destination cloud if the combined weight of the virtual management components in the target destination cloud is equal to or greater than a third threshold.

3. The method of claim 2, wherein determining the combined weight is based on a corresponding assigned weight, corresponding configuration parameters and a corresponding location of each of the virtual management components in the target destination cloud.

4. The method of claim 1, further comprising:
  communicating to virtual smart components in a network control and data plane, identification information of the new destination cloud, the virtual smart components triggering network edge devices to shift to a cluster of virtual network components of the new destination cloud.

5. A network controller comprising:
a non-transitory computer readable memory having computer-readable instructions stored therein; and
one or more processors programmed to execute the computer-readable instructions to:
  monitor, using virtual bonds an orchestration plane of a Software-Defined Wide Access Network (SD-WAN) network, clusters of virtual management components of multiple cloud networks, corresponding virtual management components of one of the multiple cloud networks implementing one or more services of a SD-WAN solution;
  detect, using the virtual bonds, a failover event at the one of the multiple cloud networks; and
  identify, by the virtual bonds, a new destination cloud network to migrate the one or more services of the SD-WAN solution to, from a source cloud network at which the failover event is detected;
  wherein each of the virtual bonds has an established secure channel to each virtual management component in each of the clusters;
  wherein monitor the clusters comprises determine a number of inactive virtual management components of each of the multiple cloud networks;
  wherein detecting the failover event comprises:
    determine, by each of the virtual bonds and based on the number of inactive virtual management components in the one of the multiple cloud networks, an active status or an inactive status for a corresponding cluster; and
    determine the failover event for the one of the multiple cloud networks, when a first threshold number of the virtual bonds determine that the number of inactive virtual management components in the corresponding cluster is equal to a second threshold.

6. The network controller of claim 5, wherein the virtual bonds are configured to execute the computer-readable instructions to identify the new destination cloud network by:
  determining a combined weight of virtual management components in a target destination cloud;
  identifying the target destination cloud as the new destination cloud if the combined weight of the virtual management components in the target destination cloud is equal to or greater than a third threshold.

7. The network controller of claim 6, wherein determining the combined weight is based on a corresponding assigned weight, corresponding configuration parameters and a corresponding location of each of the virtual management components in the target destination cloud.

8. The network controller of claim 5, wherein the virtual bonds are configured to execute the computer-readable instructions to communicate to virtual smart components in a network control and data plane, identification information of the new destination cloud, the virtual smart components triggering network edge devices to shift to a cluster of virtual network components of the new destination cloud.

9. One or more non-transitory computer-readable media comprising computer-readable instructions, which when executed by one or more processors, cause the one or more processors to perform operations comprising:
  monitor, using virtual bonds an orchestration plane of a Software-Defined Wide Access Network (SD-WAN) network, clusters of virtual management components of multiple cloud networks, corresponding virtual management components of one of the multiple cloud networks implementing one or more services of a SD-WAN solution;
  detect, using the virtual bonds, a failover event at the one of the multiple cloud networks; and
  identify, by the virtual bonds, a new destination cloud network to migrate the one or more services of the SD-WAN solution to, from a source cloud network at which the failover event is detected;
  wherein each of the virtual bonds has an established secure channel to each virtual management component in each of the clusters;
  wherein monitor the clusters comprises determine a number of inactive virtual management components of each of the multiple cloud networks;
  wherein detecting the failover event comprises:
    determine, by each of the virtual bonds and based on the number of inactive virtual management components in the one of the multiple cloud networks, an active status or an inactive status for a corresponding cluster; and determine the failover event for the one of the multiple cloud networks, when a first threshold number of the virtual bonds determine that the number of inactive virtual management components in the corresponding cluster is equal to a second threshold.

10. The one or more non-transitory computer-readable media of claim 9, wherein the execution of the computer-readable instructions by the one or more processors cause the virtual bonds to identify the new destination cloud network by:

determining a combined weight of virtual management components in a target destination cloud;

identifying the target destination cloud as the new destination cloud if the combined weight of the virtual management components in the target destination cloud is equal to or greater than a third threshold.

11. The one or more non-transitory computer-readable media of claim 10, wherein determining the combined weight is based on a corresponding assigned weight, corresponding configuration parameters and a corresponding location of each of the virtual management components in the target destination cloud.

* * * * *